United States Patent [19]

Fukunaga et al.

[11] Patent Number: 4,906,257
[45] Date of Patent: Mar. 6, 1990

[54] METHOD OF AND APPARATUS FOR TREATING WASTE GAS FROM SEMICONDUCTOR MANUFACTURING PROCESS

[75] Inventors: Akira Fukunaga, Kanagawa; Manabu Tsujimura, Kanagawa; Ohsato, Masaaki, Ibaraki, all of Japan

[73] Assignee: Takeda Chemical Industries, Ltd., Osaka, Japan

[21] Appl. No.: 248,905

[22] Filed: Sep. 23, 1988

[30] Foreign Application Priority Data

Sep. 25, 1987 [JP] Japan .................................. 62-238859

[51] Int. Cl.4 .............................................. B01D 53/04
[52] U.S. Cl. ............................................ 55/21; 55/62; 55/74; 55/271; 55/312; 55/314; 55/387
[58] Field of Search ......... 55/57, 58, 71, 74, 309–314, 55/387, 21, 59, 62, 161–163, 271

[56] References Cited

U.S. PATENT DOCUMENTS

| 1,677,804 | 7/1928 | Thayer | 55/314 X |
| 3,545,500 | 12/1970 | Bovio | 55/312 X |
| 3,775,949 | 12/1973 | Wächter | 55/312 |

FOREIGN PATENT DOCUMENTS 1201018 8/1970 United Kingdom .................. 55/312

OTHER PUBLICATIONS

Plant and Process, Kogyo Tchosaki Publishing Co., Ltd., Jul. 1986, vol. 28, No. 7, index and pp. 22–23.
Plant and Process Kogyo Tchosaki Publishing Co., Ltd., Aug. 1986, vol. 28, No. 8, index and pp. 22–23 and pp. 40–49.
Odorous Compounds and Hydrocarbons Control Methods, Environmental Protection Technical Series, Ed. by the Society of Chemical Engineers, Japan, 11/15/77.

Primary Examiner—Robert Spitzer
Attorney, Agent, or Firm—Wenderoth, Lind & Ponack

[57] ABSTRACT

A method of and apparatus for treating waste gas from semiconductor manufacturing equipment with a dry solid absorbent. A bypass pipe which is equipped with a bypass valve is provided between inlet and outlet pipes of a container packed with the absorbent, and when a reaction chamber of the semiconductor manufacturing equipment is evacuated to a level below that of atmospheric pressure, the bypass valve is opened to prevent the large amount of non-toxic gas that is discharged from the reaction chamber during the evacuation from being fed to the absorbent-packed container. Large variations in the flow rate of the gas are thus avoided and safe and efficient waste gas treatment with a dry solid absorbent having a relatively small particle diameter is possible.

12 Claims, 1 Drawing Sheet

METHOD OF AND APPARATUS FOR TREATING WASTE GAS FROM SEMICONDUCTOR MANUFACTURING PROCESS

BACKGROUND OF THE INVENTION

1. Field of the Invention

The present invention relates to a method of and apparatus for treating waste gas from a semiconductor manufacturing process. More particularly, the present invention pertains to a method which is suitable for treating such a waste gas with a dry solid absorbent. The present invention is also concerned with an apparatus which may be effectively employed to practice this waste gas treatment method.

2. Description of the Prior Art

In the manufacture of semiconductor devices, dry processes such as plasma CVD and plasma etching have been progressively adopted and, as a result, there has been an increasing demand for a method of effectively treating the waste gas discharged from such dry processes. In particular, a waste gas treatment that utilizes a dry process has recently been strongly desired in view of the simplicity and other advantages it could offer, and absorbents for various kinds of gas have been developed and put into practical use.

A detailed examination of the flow rate of gas discharged from the above-described dry process has revealed that the flow rate of gas discharged during the treatment of wafers is substantially equal to the total flow rate of gas used, i.e., about several liters per minute, whereas, when the reaction chamber is evacuated to a level below that of atmospheric pressure, the gas is discharged at a flow rate of several thousands of l/min, which is equivalent to the rated displacement of the evacuating pump used, although this only takes place for a short period of time.

In the case where waste gas discharged from semiconductor manufacturing equipment is directly treated with a dry solid absorbent, it is necessary to employ an absorbent which enables the treatment to be stably and safely carried out independently of such extremely large variations in the gas flow rate. More specifically, it is necessary to employ such an absorbent that, even when waste gas is passed through a packed layer of absorbent at a high flow rate, substantially no rise in the resistance to gas flow occurs, and the gas component which is to be removed can be completely absorbed within the packed layer. However, to maintain the resistance to gas flow at a low level, a coarse absorbent must be used; this involves the problem that, as the particle diameter of the absorbent increases, the surface area which participates in absorption or adsorption becomes relatively low, which leads to a reduced absorbing capacity. Although attempts have been made to increase the absorbing capacity by, for example, using a porous absorbent, there is a limit to the effectiveness of these methods; in fact, a predetermined absorbing capacity can only be ensured by packing a considerably large amount of absorbent. Some kinds of waste gas react with the packed absorbent to form solid matter; in such a case, even if a coarse absorbent is used, the packed layer gradually becomes clogged with the reaction product, resulting inevitably in an increased resistance to gas flow.

SUMMARY OF THE INVENTION

In view of the above-described circumstances, it is a primary object of the present invention to provide a method of treating waste gas from semiconductor manufacturing equipment with a dry solid absorbent which enables avoidance of large variations in the flow rate of waste gas and thus permits safe and efficient waste gas treatment with an absorbent having a relatively small particle diameter, and also to provide an apparatus which may be effectively employed to practice this waste gas treatment method.

To this end, the present invention provides a method of treating waste gas from semiconductor manufacturing equipment with a dry absorbent wherein a bypass pipe which is equipped with a bypass valve is provided between inlet and outlet pipes of a container packed with the absorbent and wherein a wafer is set in a reaction chamber of the semiconductor manufacturing equipment under atmospheric pressure, and then, when the reaction chamber is evacuated to a level below that of atmospheric pressure, the bypass valve is opened to prevent a large amount of the non-toxic gas that is discharged from the reaction chamber during the evacuation from being fed to the absorbent-packed container.

The above and other objects, features and advantages of the present invention will become more apparent from the following description taken in conjunction with the accompanying drawing.

DESCRIPTION OF THE PREFERRED EMBODIMENTS

Figure 1:
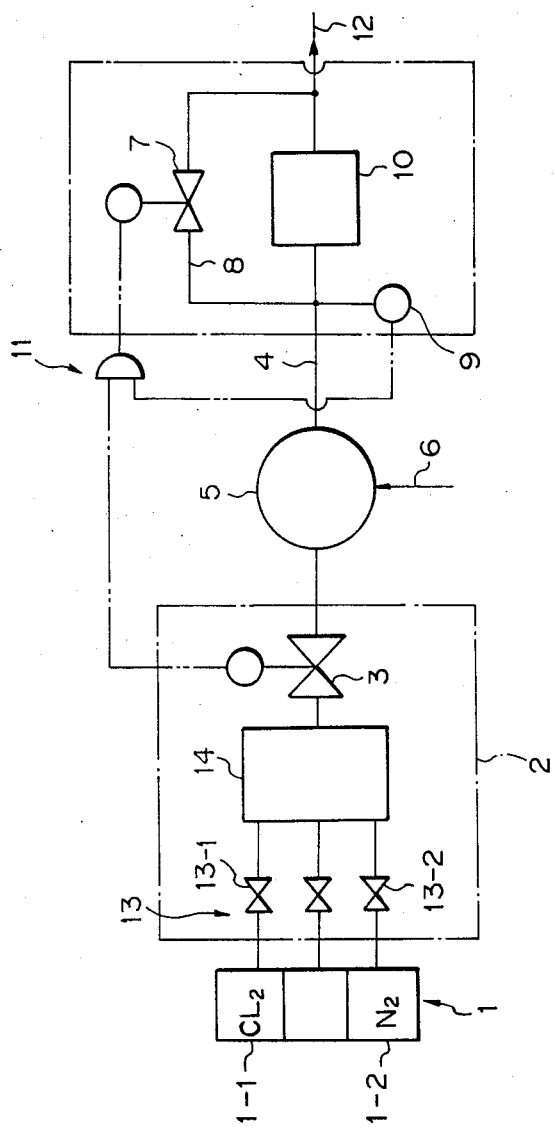
FIG. 1 is a schematic of the flow of the waste gas from semiconductor manufacturing equipment to a container packed with a waste gas absorbent.

The present invention will be described hereinunder in detail with reference to the accompanying drawing.

Referring to FIG. 1, which schematically shows the flow of waste gas from semiconductor manufacturing equipment 2 to a container 10 packed with a waste gas absorbent, the semiconductor manufacturing equipment 2 may be of any type, provided that the equipment treats wafers under a high vacuum in a process such as plasma CVD or plasma etching, and therefore the kind and flow rate of process gas 1 may also be selected as desired in accordance with the conditions of each individual process. Further, it is also possible to select as desired the kind and amount of absorbent which is to be packed in the container 10 and the dimensions and configuration of the packed container 10.

Generally speaking, during a wafer treatment, the process gas 1 (1-1 and 1-2) is fed into a reaction chamber 14 of the semiconductor manufacturing equipment 2 through a valve 13 (13-1 and 13-2) to react with wafers, and the waste gas generated after the reaction is sent by the operation of an evacuating device 5 to the absorbent-packed container 10 where it is made harmless before being discharged.

When the reaction chamber 14 of the semiconductor manufacturing equipment 2 is evacuated to a predetermined level of pressure (about $1-10^{-5}$ torr), after the pressure inside the chamber 14 has been returned to atmospheric pressure (about 760 torr) in order to allow the replacement of wafers or to conduct maintenance, a bypass valve 7 is opened to release a large amount of the non-toxic gas from the reaction chamber 14 through a bypass pipe 8, thereby preventing the large amount of flowing gas from being passed through the absorbent-packed container 10. Since the large amount of gas is not discharged until a main valve 3 is opened, the bypass valve 7 may be opened in advance on the basis of a signal through an electric circuit 11 for opening the main valve 3. However, since the main valve 3 is kept open during the etching process, the bypass valve 7 is also left open unless otherwise arranged. Therefore, the bypass valve 7 is arranged to be closed by the action of a timer after a predeterined period of time has elapsed. It is possible to set the timer to any period of time so long as it is one within which the flow rate of the discharged gas and the inlet pressure of the absorbent-packed container 10 can drop sufficiently and within which no process gas will be fed into the reaction chamber 14.

If a large amount of discharged non-toxic gas is fed directly into the absorbent-packed container 10, the pressure at the inlet of the container 10 rises. Therefore, the arrangement may be such that such a rise in pressure is detected by means of a pressure sensor 9 and the bypass valve 7 is opened in response to a signal output through the electric circuit 11 from the pressure sensor 9. In such a case, however, a hunting phenomenon may occur in which, at the same time as the bypass valve 7 is opened, the inlet pressure lowers, and the pressure sensor 9, which detects this lowering in pressure, closes the bypass valve 7, resulting in the pressure rising such as to cause the bypass valve 7 to open again. It is therefore preferable to employ a timer and to set it so that the bypass valve 7 is closed after the evacuation has achieved the desired lowering of the flow rate of the non-toxic and so that, even when the bypass valve 7 is closed, the inlet pressure is sufficiently low and there is hence no fear of the bypass valve 7 being undesirably opened again.

Since waste gas stays in a waste gas pipe 4 which extends from the evacuating device 5 to the absorbent-packed container 10 immediately after the completion of wafer treatment, if, in this state, a large amount of the non-toxic gas is discharged via the bypass valve 7, part of the waste gas which is to be removed may be released in the form of an untreated waste gas. For this reason, it is preferable to purge the waste gas remaining in the pipe 4 with an inert gas introduced through a pipe 6 so that the residual waste gas is fed to the absorbent-packed container 10 before the reaction chamber 14 is evacuated, and then to open the bypass valve 7 to release a large amount of the non-toxic gas in the reaction chamber.

The inert purging gas may be injected into the evacuating device 5 or from an appropriate position which is immediately downstream of it, and the injection of the inert purging gas may be effected either at all times or for a predetermined period of time immediately before the evacuation of the reaction chamber 14. The flow rate of the injected inert gas should be determined by taking into consideration the volume of the pipe, the injection time and so forth. It should be noted that the treated waste gas is discharged through an outlet pipe 12 into the atmosphere.

Furthermore, the electrical circuit 11 is an electric circuit for opening and closing the bypass valve 7 either on the basis of a signal from main valve 3 or in response to a signal from a pressure sensor 9.

By employing the treatment method and apparatus according to the present invention for dry treatment of waste gas from a semiconductor manufacturing process, it is possible to avoid large variations in the flow rate of gas and therefore possible to carry out efficient and safe treatment without causing a rise in the resistance to gas flow even when an absorbent having a relatively small particle diameter is employed.

More specifically, since a large amount of the non-toxic gas that is discharged from the reaction chamber when evacuated to a level below that of atmospheric pressure is passed through the bypass passage, the flow rate of gas which is fed to the absorbent-packed container is only about several liters per minute. Therefore, even when the particle diameter of the absorbent is reduced considerably to increase the surface area and thereby improve the reaction efficiency, the resistance to gas flow is maintained at a low level. Accordingly, the load on the device used to evacuate the reaction chamber is reduced, and the toxic waste gas treatment can be conducted safely.

Further, since the flow rate of toxic waste gas is low, the time during which the toxic waste gas is in contact with the absorbent is increased and the absorbent utilization efficiency is hence improved by a large margin. Accordingly, it is possible to reduce the amount of absorbent required to effect a certain treatment and hence reduce the size of the packed container. Further, even when solid matter is formed by the reaction of waste gas with the absorbent, the resulting solid matter will not give rise to any significant rise in the resistance to gas flow since the gas flow rate is considerably low.

By purging the evacuating device and the piping system with an inert gas at all times or immediately before the evacuation of the reaction chamber, it is possible not only to completely feed the toxic gas component to be treated to the absorbent-packed container but also to keep the evacuating device and the piping system clean at all times, which makes it possible to protect the whole of the apparatus from corrosion and other dangerous phenomena. It is also possible to effect purging when the evacuating device or the piping system is disconnected when inspection or repair work is to be carried out and it is therefore possible to conduct such an operation safely without any fear of dangerous gas leakages.

As has been described above, in the treatment of a waste gas from a semiconductor process, the large amount of the non-toxic gas which is discharged from the reaction chamber when evacuated to a level below that of atmospheric pressure is not passed through the absorbent-packed container but is released through a bypass pipe, and the toxic gas component to be treated which stays in the pipe leading to the packed container is purged with an inert gas in advance of the evacuation. It is thus possible to enjoy many advantages.

Although the present invention has been described through specific terms, it should be noted here that the described embodiment is not necessarily exclusive and various changes and modifications may be imparted thereto without departing from the scope of the invention which is limited solely by the appended claims.

Hereinunder, the present invention will be described more specifically by way of an Example. However, the present invention is in no way restricted by this Example.

EXAMPLE

An example in which the present invention is applied to an etching device is given hereinbelow.

In FIG. 1 the driving sequence is given and the feature of the present invention is explained.

(i) initial stage:
1-1. Cl$_2$, 1-2. N$_2$ are at standstill.
3. main valve . . . closed
5. evacuating device . . . in perpetual operation
6. purge gas N$_2$ = 5 lit./min., the gas is flowing at all times
7. by-pass valve . . . closed
9. pressure sensor . . . off
13-1. valve for Cl$_2$ . . . closed
13-2. valve for N$_2$ . . . closed
14. reaction chamber . . . opened to atmosphere (ii) A wafer is placed in a reaction chamber 14 and hermetic sealing is made by closing a cover.

(iii) The main valve 3 is opened.

(iv) 20 l of atmospheric air in reaction chamber 14 is vented by the evacuating device 5. Since the air vent rate is 1200 l/min., a large amount of atmospheric air is introduced into an absorbent vessel 10 at the initial stage of venting.

(v) Since the design flow is 0 to 30 l/min., the pressure in the absorbent vessel 10 is increased when the initial vent air flows into the vent pipe 4.

(vi) By previously opening the bypass valve 7 by the signal of opening the main valve 3, or by sensing the pressure increase by a pressure sensor 9 to open the bypass valve 7, the large amount of the initial vent air is vented mainly through a bypass line 8.

The gas bypassed at this time is solely non-toxic gas as explained below.

(vii) Since the atmospheric air in reaction chamber 14 is evacuated in several (1 to 10) seconds, the pressure is not increased when the bypass valve 7 is closed subsequently.

(viii) The valve 13-1 for Cl$_2$ is opened to admit Cl$_2$ at the rate of 0.5 l/min. into the reaction chamber 14 to effect the etching reaction.

(ix) After termination of etching, the valve 13-1 for Cl$_2$ is closed and the valve 13-2 for N$_2$ is opened so that the atmosphere in the reaction chamber is replaced by N$_2$.

(x) The valve 13-2 for N$_2$ is closed.

(xi) In this state, since the Cl$_2$ gas is left from the evacuating device 5 to the absorbent vessel, it is not possible to pass to the next bypass sequence. Therefore, the time interval during which the next wafer is set is advantageously employed to introduce the residual Cl$_2$ gas into the absorbent vessel 10 by the purge gas N$_2$ 6 to render the gas non-toxic in advance. In this manner, only the nontoxic gas is bypassed at the next bypassing.

(xii) The sequence returns to step (ii).

What is claimed is:

1. A method of treating waste gas, comprising the steps of:
providing a reaction chamber, a container housing a dry solid absorbent, inlet conduit means providing gas communication between said reaction chamber and said dry solid absorbent in said container, exit conduit means providing gas communication between said dry solid absorbent in said container and the atmosphere, and evacuation device disposed between said reaction chamber and said inlet conduit means, said evacuation device providing gas communication between said reaction chamber and said inlet conduit means and adapted to force gas flow from said reaction chamber to said inlet conduit means, bypass conduit means providing gas communication between said inlet conduit means and said exit conduit means, and a bypass valve for closing said bypass conduit means;

flowing waste gas from said reaction chamber through said evacuation device, said inlet conduit means, said dry solid absorbent in said container and said exit conduit means to the atmosphere with said bypass valve closed;

introducing a first inert purge gas into said reaction chamber for a period of time sufficient to purge said reaction chamber of the waste gas;

introducing a second inert purge gas into said evacuation device for a period of time sufficient to purge the waste gas from said evacuation device, said inlet conduit means and at least a portion of said bypass conduit means; and venting a large amount of gas from the reaction chamber to the atmosphere with said bypass valve open, the gas venting through said evacuation device, said inlet conduit means, both said dry solid absorbent in said container and said bypass conduit means, and said exit conduit means.

2. A method as in claim 1, wherein said steps of introducing said purge gasses comprise introducing said purge gasses at a rate of approximately 1 to 30 l/min.

3. A method as in claim 2, wherein said steps of introducing said first and said second purge gasses comprise introducing purge gasses of substantially identical composition.

4. A method as in claim 1, wherein said providing step further comprises providing a main valve operatively disposed between said reaction chamber and said evacuation device, signal generation means operatively associated with said main valve, and means for controlling said bypass valve in response to a signal from said signal generation means, and wherein said venting step further comprises opening said main valve substantially immediately prior to said venting, said opening of said main valve causing said signal generation means to send said signal to said means controlling said bypass valve, thereby causing said controlling means to open said bypass valve.

5. A method as in claim 4, wherein said providing step further comprises providing said controlling means with a timer operatively connected thereto, and wherein said venting step further comprises said controlling means closing said bypass valve after a set period of time upon a signal from said timer.

6. A method as in claim 1, wherein said providing step further comprises providing a gas pressure sensor disposed within said inlet conduit means between said evacuation device and said container, said gas pressure sensor including signal generation means, and means for controlling said bypass valve in response to a signal from said signal generation means, and wherein said step of venting includes said controlling means opening said bypass valve in response to said signal from said gas pressure sensor.

7. A method as in claim 6, wherein said providing step further comprises providing said controlling means with a timer operatively connected thereto, and wherein said venting step further comprises said controlling means closing said bypass valve after a set period of time upon a signal from said timer.

8. An apparatus for treating waste gas, comprising:
a reaction chamber;
a container housing a dry solid absorbent;

inlet conduit means providing gas communication between said reaction chamber and said dry solid absorbent in said container;

exit conduit means providing gas communication between said dry solid absorbent in said container and the atmosphere;

an evacuation device disposed between said reaction chamber and said inlet conduit means, said evacuation device providing gas communication between said reaction chamber and said inlet conduit means and adapted to force gas flow from said reaction chamber to said inlet conduit means;

bypass conduit means providing gas communication between said inlet conduit means and said exit conduit means; and a bypass valve adapted to open or close said bypass conduit means, whereby gas will flow through said dry solid absorbent when said bypass valve is closed, and will flow through both said dry solid absorbent and said bypass conduit means when said bypass valve is open.

9. An apparatus as in claim 8, further comprising:

a main valve operatively disposed between said reaction chamber and said evacuation device;

signal generation means operatively associated with said main valve; and means for controlling said bypass valve in response to a signal from said signal generation means.

10. An apparatus as in claim 9, wherein said controlling means includes a timer operatively connected thereto, whereby said controlling means will close said bypass valve after a set period of time in response to a signal from said timer.

11. An apparatus as in claim 8, further comprising:

a gas pressure sensor disposed within said inlet conduit means between said evacuation device and said container, said gas pressure sensor including signal generation means; and means for controlling said bypass valve in response to a signal from said signal generation means.

12. An apparatus as in claim 11, wherein said controlling means includes a timer operatively connected thereto, whereby said controlling means will close said bypass valve after

* * * * *

UNITED STATES PATENT AND TRADEMARK OFFICE
CERTIFICATE OF CORRECTION

PATENT NO. : 4,906,257

DATED : March 6, 1990

INVENTOR(S) : Akira FUKUNAGA et al.

It is certified that error appears in the above-identified patent and that said Letters Patent is hereby corrected as shown below:

On the title page, line [73], for "Takeda Chemical Industries, Ltd., Osaka, Japan", read --Ebara Corporation, Tokyo, Japan-- and --Ebara Research Co., Ltd., Fujisawa, Japan--.

Signed and Sealed this

Twenty-third Day of July, 1991

Attest:

HARRY F. MANBECK, JR.

Attesting Officer

Commissioner of Patents and Trademarks